United States Patent [19]

Tseng

[11] 4,407,743

[45] Oct. 4, 1983

[54] NOVEL N,N'-BIS(TRIFLUOROMETHYLSULFONYL)OXAMIDES AND CHEMILUMINESCENT COMPOSITIONS CONTAINING THE SAME

[75] Inventor: Shin-Shyong Tseng, Bridgewater, N.J.

[73] Assignee: American Cyanamid Company, Stamford, Conn.

[21] Appl. No.: 359,728

[22] Filed: Mar. 19, 1982

[51] Int. Cl.$^3$ .............................................. C09K 11/06
[52] U.S. Cl. .............................. 252/700; 252/186.43; 560/150; 560/158; 564/82
[58] Field of Search ................. 252/188.3 CL, 186.43; 560/158, 150; 564/82

[56] References Cited

U.S. PATENT DOCUMENTS 4,226,738 10/1980 Rauhut et al. ...................... 252/700
4,282,357 4/1981 Tseng et al. ........................ 252/700
4,338,213 7/1982 Tseng et al. ........................ 252/700

Primary Examiner—Irwin Gluck
Attorney, Agent, or Firm—Gordon L. Hart

[57] ABSTRACT

N,N'-bis(trifluoromethylsulfonyl)oxamides are described with 2,2,2-trifluoroethyl, (ethoxycarbonyl)methyl, and [(phenylmethoxy)carbonyl]methyl substitution at the amido nitrogen atoms. These compounds, when used in chemiluminescent formulations, furnish superior light capacity and quantum efficiency. Preparation of the compounds and their use for chemiluminescence are described.

10 Claims, No Drawings

4,407,743

NOVEL N,N'-BIS(TRIFLUOROMETHYLSULFONYL)OXAMIDES AND CHEMILUMINESCENT COMPOSITIONS CONTAINING THE SAME

This invention was made under U.S. Government Contract N00014-77-C-0634 and is subject to the provisions of ASPR 7-104.18, December, 1969, and ASPR 7-302.23(b) long form August, 1977.

The present invention relates to novel N,N'-bis(trifluoromethylsulfonyl)oxamide compounds, superior compositions containing said compounds which are useful for generating chemiluminescence by reaction with a hydroperoxide, and a process for generating chemiluminescence by reacting said superior compositions thereby.

The art has shown (Rauhut et al, U.S. Pat. No. 4,226,738) that N,N'-bis[(trifluoromethyl)sulfonyl]oxamides when reacted under particular conditions provide chemiluminescence, while the aryl-substituted oxamides described therein provide high light capacity and efficiency, as measured by the chemiluminescence quantum yield, the alkyl-substituted oxamides have chemiluminescence quantum yields which are very low, about 4.5 percent, or lower.

There is a need, therefore, for alkyl-substituted N,N'-bis[(trifluoromethyl)sulfonyl]oxamides that will furnish higher light capacities and significantly higher quantum efficiencies.

SUMMARY OF THE INVENTION

In accordance with the present invention, there are provided novel compounds represented by formula (I)

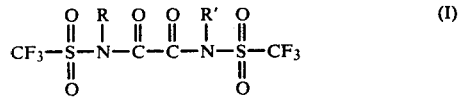

wherein R and R' independently represent substituted alkyl of 1 to 6 carbon atoms wherein the substituents are selected from trihalomethyl, $C_1$-$C_6$ alkoxycarbonyl, or $C_6$-$C_{10}$ arylalkoxycarbonyl wherein the alkoxy moiety is of 1 to 6 carbon atoms.

In accordance with the present invention, there are also provided compositions for reaction with a peroxide component to generate chemiluminescence comprising (a) a compound of formula (I), as previously defined, (b) an organic fluorescer compound, and (c) a diluent, said ingredients being present in proportions and concentrations sufficient to produce chemiluminescence when reacted with said peroxide component.

In accordance with the present invention, there is also provided a process for generating chemiluminescence comprising reacting the composition described hereinabove with a peroxide component.

Chemiluminescent compositions of the novel compounds of formula (I) find a wide variety of applications in emergency lighting devices (see U.S. Pat. No. 3,800,132) for the home, on the road, in coal mines, on lifevests, and on aircraft escape slides.

The compounds of the present invention can be used to provide long lasting chemiluminescence. They are particularly distinguished from the alkyl-substituted oxamides of U.S. Pat. No. 4,226,738 in that they provide superior chemiluminescence quantum yields, about 10 to 20%, versus about 1 to 5%, or lower, for the prior art oxamides.

DESCRIPTION OF PREFERRED EMBODIMENTS

The compounds of the present invention are readily prepared by reacting about two molecular proportions of the appropriate trifluoromethanesulfonamide with oxalyl chloride in the presence of an acid-binding agent by methods well-known in the art.

Methods for the preparation of N-substituted trifluoromethanesulfonamides are known in the art (see Harrington et al, U.S. Pat. Nos. 3,558,698; 3,629,332; 3,799,968; 3,865,844; 3,897,449; 3,920,444; and Moore et al, U.S. Pat. No. 3,609,187).

Examples of the compounds of formula (I) include the following:

N,N'-bis[[(phenylmethoxy)carbonyl]methyl]-N,N'-bis[(trifluoromethyl)sulfonyl]oxamide, N,N'-bis[(methoxycarbonyl)methyl]-N,N'-bis[(trifluoromethyl)sulfonyl]oxamide, N,N'-bis[(ethoxycarbonyl)methyl]-N,N'-bis(trifluoromethyl)sulfonyl]oxamide, N,N'-bis(2,2,2-trifluoroethyl)-N,N'-bis[(trifluoromethyl)sulfonyl]oxamide, N,N'-bis(2,2,2-trichloroethyl)-N,N'-bis[(trifluoromethyl)sulfonyl]oxamide, and the like.

The term "chemiluminescence," as employed herein, is defined as the generation of electromagnetic radiation between about 300 and 1200 nanometers by means of a chemical reaction.

The term "composition for reaction with a peroxide component to generate chemiluminescence," as employed herein, is defined as a mixture of a compound of formula (I) and a fluorescer compound in a diluent in concentrations sufficient to produce chemiluminescence when combined with a peroxide component. Thus, the initial concentrations of the compound of formula (I), fluorescer compound, and the ingredients of the peroxide component in the reaction mixture must be sufficient to produce chemiluminescence.

The fluorescer compounds contemplated herein may be broadly defined as those which do not readily react with the peroxide component employed in this invention or with the compound of formula (I).

Typical suitable fluorescent compounds for use in the present invention are those which have a spectral emission falling between 300 and 1200 nanometers and which are at least partially soluble in the diluent employed. Among these are the conjugated polycyclic aromatic compounds having at least 3 fused rings, such as: anthracene, substituted anthracene, benzanthracene, phenanthrene, substituted phenanthrene, naphthacene, substituted naphthacene, pentacene, substituted pentacene, perylene, substituted perylene, violanthrone, substituted violanthrone, and the like. Typical substituents for all of these are phenyl, lower alkyl, chlorine, bromine, cyano, alkoxy ($C_1$-$C_{16}$), and other like substituents which do not interfere with the light-generating reaction contemplated herein.

Numerous other fluorescent compounds having the properties given hereinabove are well-known in the art. Many of these are fully described in "Fluorescence and Phosphorescence," by Peter Pringsheim, Interscience Publishers, Inc., New York, N.Y., 1969. Other fluorescers are described in "The Colour Index," Second Edition, Volume 2, The American Association of Textile Chemists and Colorists, 1956, pp. 2907–2923. While only typical fluorescent compounds are listed hereinabove, the person skilled in the art is fully aware of the fact that this invention is not so restricted, and that numerous other fluorescent compounds having similar properties are contemplated for use herein.

The preferred fluorescer compound is a 9,10-bis(phenylethynyl)anthracene, as disclosed in U.S. Pat. No. 3,888,786, which is incorporated herein by reference.

The 9,10-bis(phenylethynyl)anthracene compounds contemplated herein may be defined as 9,10-bis(phenylethynyl)anthracene, or chloro, bromo, fluoro, or lower alkyl substituted bis(phenylethynyl)anthracenes. The preferred compound is selected from 9,10-bis(phenylethynyl)anthracene or chloro-substituted 9,10-bis(phenylethynyl anthracenes. More preferably, the compound is selected from 9,10-bis(phenylethynyl)anthracene, 1-chloro-9,10-bis(phenylethynyl)anthracene, or 2-chloro-9,10-bis(phenylethynyl)anthracene.

Illustrative of the 9,10-bis(phenylethynyl)anthracenes which can be used in this invention are the following:
9,10-bis(phenylethynyl)anthracene,
1-chloro-9,10-bis(phenylethynyl)anthracene,
2-chloro-9,10-bis(phenylethynyl)anthracene,
1,5-dichloro-9,10-bis(phenylethynyl)anthracene,
1,8-dichloro-9,10-bis(phenylethynyl)anthracene,
1-bromo-9,10-bis(phenylethynyl)anthracene,
1-fluoro-9,10-bis(phenylethynyl)anthracene,
1-methyl-9,10-bis(phenylethynyl)anthracene,
and the like.

The term "diluent," as used herein, is defined as a solvent, or vehicle, for the compound of formula (I), and the fluorescer compound.

The term "peroxide component," as used herein, means a solution of a hydrogen peroxide compound, a hydroperoxide compound, or a peroxide compound in a suitable diluent.

The term "hydrogen peroxide compound" includes (1) hydrogen peroxide and (2) hydrogen peroxide-producing compounds.

The composition for reaction with a peroxide component to generate chemiluminescence can contain any fluid diluent which solubilizes the compound of formula I and the fluorescer compound to provide initial concentrations in the reacting system of about $10^{-3}$ M to about 10 M, preferably about $10^{-2}$ M to about 1 M, of the compound of formula (I), and about $10^{-5}$ M to about $10^{-1}$ M, preferably about $10^{-4}$ M to $10^{-2}$ M, of the fluorescer compound. The diluent must be relatively unreactive toward the other ingredients of the chemiluminescent mixture.

The concentrations of the compound of formula (I) and the fluorescer compound in the composition for reaction with the peroxide component is about 1.1–2.5, preferably about 1.2–1.3, times the concentrations of the same materials in the reacting system described above. Typical diluents, or solvents, which can be used include esters, ethers, aromatic hydrocarbons, chlorinated aliphatic and aromatic hydrocarbons such as those disclosed in U.S. Pat. No. 3,749,679. The preferred diluent is dibutyl phthalate. Solvent combinations may, of course, be used but such combinations should not include strongly electron donating solvents.

Hydrogen peroxide is the preferred hydroperoxide and may be employed as a solution of hydrogen peroxide in a solvent or as an anhydrous hydrogen peroxide compound such as sodium perborate, sodium peroxide, and the like. Whenever hydrogen peroxide is contemplated to be employed, any suitable compound may be substituted which will produce hydrogen peroxide.

Diluents which can be employed in the peroxide component include any fluid which is relatively unreactive toward the hydroperoxide, the compound of formula (I) and the fluorescer compound, and which accommodates a solubility to provide at least 0.01 M hydroperoxide solution. Suitable diluents for the hydroperoxide component include water; alcohols, such as ethanol, tertiary butanol, or octanol; ethers, such as diethyl ether, diamyl ether, tetrahydrofuran, dioxane, dibutyldiethyleneglycol, perfluoropropyl ether, and 1,2-dimethoxyethane; and esters, such as ethyl acetate, ethyl benzoate, dimethyl phthalate, dioctylphthalate, propyl formate. Solvent combinations can, of course, be used such as combinations of the above with anisole, tetralin, and chlorobenzene, providing said solvent combination accommodates hydroperoxide solubility. However, strong electron donor solvents such as dimethylformamide, dimethyl sulfoxide, and hexamethylphosphoramide should not, in general, be used as a major diluent for the peroxide component.

The preferred diluent for the peroxide component is a mixture of about 80-volume percent dimethyl phthalate and about 20-volume percent tertiary butanol.

The hydrogen peroxide concentration in the peroxide component may range from about 0.2 M to about 15 M. Preferably, the concentration ranges from about 1 M to about 2 M.

The lifetime and intensity of the chemiluminescent light emitted can be regulated by the use of certain regulators such as:

(1) by the addition of a catalyst which changes the rate of reaction of hydroperoxide with the compound of formula (I). Catalysts which accomplish that objective include those described in M. L. Bender, "Chem. Revs.," Vol. 60, p. 53 (1960). Also, catalysts which alter the rate of reaction or the rate of chemiluminescence include those accelerators of U.S. Pat. No. 3,775,366, and decelerators of U.S. Pat. Nos. 3,691,085 and 3,704,231, or (2) by the variation of hydroperoxide. Both the type and the concentration of hydroperoxide are critical for the purposes of regulation.

Preferably, a weakly basic accelerator, such as sodium salicylate, is included in the peroxide component to control the lifetime of the chemical lighting system. The concentration of weakly basic accelerator used in the peroxide component may range from about $10^{-6}$ M to about $10^{-2}$ M, preferably from about $10^{-4}$ M to about $10^{-3}$ M.

The initial concentration of the ingredients of the peroxide component in the reacting system is about 0.15 to 0.60 of the concentrations in the peroxide component since the peroxide component comprises about 15 to about 60-volume percent of the reaction mixture.

The concentration of the hydrogen peroxide compound in the chemiluminescent reaction is at least equal to the molar concentration of the compound of formula (I) and is preferably 1.2 to 5.0 times the concentration of the compound of formula (I) in the reacting system described above. The optimum concentrations must be determined experimentally for each specific system.

The following examples are illustrative of the present invention. All parts are by weight unless otherwise indicated.

EXAMPLE 1

Preparation of N-(Ethoxycarbonyl)Methyl-Trifluoromethanesulfonamide

Trifluoromethanesulfonic anhydride (164 grams; 0.58 mole) is added dropwise to a stirred suspension of ethyl glycinate hydrochloride (69 grams; 0.49 mole) and triethylamine (120 grams; 1.17 mole) in methylene chloride (500 mls) at 0° C. under a nitrogen atmosphere. The reaction mixture is allowed to warm up to room temperature upon completion of the addition, and stirred thereat for 20 hours. The white solid precipitate is separated by filtration and the filtrate is evaporated to obtain 308.1 grams of a semi-solid which is subsequently extracted with diethyl ether (3×400 mls). The combined ethereal extracts are then evaporated to obtain 67.87 grams of crude product. Recrystallization of the crude product from cyclohexane gives the desired product, m.p. 73°–75° C.

Calculated for $C_5H_8NO_4SF_3$: C,25.55%; H,3.40%; N,5.96%. Found: C,25.77%; H,3.70%; N,5.96%.

In the manner described above using the appropriately substituted amines, the following compounds are prepared:

N-[(phenylmethoxy)carbonyl]methyl-trifluoromethanesulfonamide,
N-2,2,2-trifluoroethyl-trifluoromethanesulfonamide,
N-2,2,2-trichloroethyl-trifluoromethanesulfonamide, and
N-(methoxycarbonyl)methyl-trifluoromethanesulfonamide.

EXAMPLE 2

Preparation of N,N'-Bis[(ethoxycarbonyl)methyl]-N,N'-Bis[(trifluoromethyl)sulfonyl]Oxamide A solution of oxalyl chloride (2.18 grams; 0.017 mole) in 20 mls of dry tetrahydrofuran is added dropwise to a solution of the product of Example 1 (6.2 grams; 0.026 mole) and triethylamine (2.7 grams; 0.027 mole) in 50 mls of dry tetrahydrofuran at 0° C. under a nitrogen atmosphere. After the addition is completed, the mixture is stirred at room temperature for 3 hours, and filtered to remove triethylamine hydrochloride. The resulting filtrate is then evaporated to obtain 6.88 grams of crude product. Recrystallization of the crude product from cyclohexane gives the desired product, m.p. 88°–90° C.

Calculated for $C_{12}H_{10}N_2O_{10}S_2F_6$: C,27.48%; H,2.67%; N,5.34%. Found: C,27.69%; H,2.74%; N,5.21%.

EXAMPLE 3

Preparation of N,N'-Bis(2,2,2-trifluoroethyl)-N,N'-Bis[(trifluoromethyl)sulfonyl]Oxamide A solution of oxalyl chloride (2.62 grams; 0.021 mole) in 10 mls of dry tetrahydrofuran is added dropwise to a solution of N-2,2,2-trifluoroethyl-trifluoromethylsulfonamide (7.75 grams; 0.034 mole) and triethylamine (3.5 grams; 0.035 mole) in 50 mls of dry tetrahydrofuran at 0° C. under a nitrogen atmosphere. After the addition is completed, the mixture is stirred at room temperature for 18 hours, and filtered to separate triethylamine hydrochloride. The tetrahydrofuran filtrate is then evaporated to obtain 7.86 grams of an oil. Vacuum sublimation of the oil gives 2.5 grams of the desired product, m.p. 43°–45° C.

Calculated for $C_8H_4N_2O_6S_2F_{12}$: C,18.60%; H,0.78%; N,5.43%. Found: C,19.18%; H,0.67%; N,5.56%.

EXAMPLE 4

Preparation of N,N'-Bis[[(phenylmethoxy)carbonyl]methyl]-N,N'-Bis[(trifluoromethyl)sulfonyl]Oxamide A solution of oxalyl chloride (1.89 grams; 0.015 mole) in 20 mls of dry tetrahydrofuran is added dropwise to a solution of N-[(phenylmethoxy)carbonyl]methyl-trifluoromethanesulfonamide (7.09 grams; 0.025 mole) and triethylamine (3.0 grams; 0.03 mole) in 80 mls of dry tetrahydrofuran at 0° C. under a nitrogen atmosphere. After the addition is completed, the mixture is stirred at room temperature for 4 hours, and filtered to separate the precipitate. Evaporation of the filtrate to dryness gives 6 grams of crude product. Recrystallization of the crude product from a mixture of hexane and cyclohexane gives the desired product, m.p. 53°–55° C.

Calculated for $C_{22}H_{18}N_2O_{10}S_2F_6$: C,40.74%; H,2.78%; N,4.32%. Found: C,40.47%; H,2.37%; N,4.47%.

EXAMPLES 5–7

Determination of Chemiluminescence

A solution (7.5 mls) of 1-chloro-9,10-bis(phenylethynyl)anthracene (CBPEA) and one of the reactants made in Examples 2–4, in dibutyl phthalate, is mixed with 2.5 mls of hydrogen peroxide and sodium salicylate disclosed in 80% dimethyl phthalate-20% tertiary butanol, by volume, to provide a reaction mixture having initial concentrations of 0.01 M of the reactant under study, $6.75 \times 10^{-3}$ M CBPEA, 0.38 M hydrogen peroxide, and $3 \times 10^{-4}$ M sodium salicylate. Quantitative measurements of the chemiluminescence is carried out by measuring the intensity of the light emitted at 555 nanometers by means of a Hirt-Roberts radiometer-spectrophotometer. The results obtained are shown in Table I.

TABLE I

| Example | Reactant | Light Capacity[a] | Quantum Yield[b] |
|---|---|---|---|
| 5 | Compound of Example 2 | 42 | 12.80 |
| 6 | Compound of Example 3 | 41 | 12.71 |
| 7 | Compound of Example 4 | 32.5 | 10.0 |

[a]Lumen-hours per liter of emitting solution
[b]Einsteins per mole × $10^2$

EXAMPLES 8 AND 9

The procedure of Examples 5–7 is followed in every detail except that $9 \times 10^{-3}$ M rubrene is used instead of CBPEA. The results obtained are shown in Table II.

EXAMPLES 10 AND 11

The procedure of Examples 5–7 is followed in every detail except that prior art oxamide reactants are used for comparison. The reactants used and the results obtained are shown in Table III. Comparison of these results with those in Table I, shows that the compounds of the invention provide significantly higher light capacity and quantum yield than the prior art reactants.

TABLE II

| Example | Reactant | Light Capacity | Quantum Yield |
|---|---|---|---|
| 8 | Compound of Example 2 | 40.1 | 19.4 |
| 9 | Compound of Example 3 | 30 | 14.4 |

TABLE III

| Example | Reactant | Light Capacity | Quantum Yield |
|---|---|---|---|
| 10 | N,N'—bis(2-chloroethyl)-N,N'—bis-[(trifluoromethyl)sulfonyl]oxamide | 12.2 | 3.68 |
| 11 | N,N'—bis(3-chloropropyl)-N,N'—bis-[(trifluoromethyl)sulfonyl]oxamide | 4.97 | 1.48 |

We claim:

1. A compound having the formula

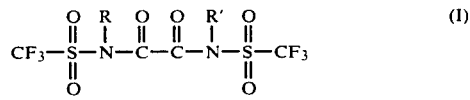

(I)

wherein R and R' independently represent substituted alkyl of 1 to 6 carbon atoms wherein the substituents are selected from trihalomethyl, $C_1$–$C_6$ alkoxycarbonyl, or $C_6$–$C_{10}$ arylalkoxycarbonyl wherein the alkoxy moiety is of 1 to 6 carbon atoms.

2. A compound defined by claim 1 wherein each of $R_1$ and $R_2$ is [(phenylmethoxy)carbonyl]methyl.

3. A compound defined by claim 1 wherein each of $R_1$ and $R_2$ is (ethoxy carbonyl)methyl.

4. A compound defined by claim 1 wherein each of $R_1$ and $R_2$ is 2,2,2-trifluoroethyl.

5. A composition for reaction with a peroxide component to generate chemiluminescence comprising a compound defined by claim 1 and an organic fluorescer, both dissolved in a liquid diluent, in proportions to produce chemiluminescence by said reaction.

6. A composition for reaction with a peroxide component to generate chemiluminescence comprising a compound defined by claim 2 and an organic fluorescer, both dissolved in a liquid diluent, in proportions to produce chemiluminescence by said reaction.

7. A composition for reaction with a peroxide component to generate chemiluminescence comprising a compound defined by claim 3 and an organic fluorescer, both dissolved in a liquid diluent, in proportions to produce chemiluminescence by said reaction.

8. A composition for reaction with a peroxide component to generate chemiluminescence comprising a compound defined by claim 4 and an organic fluorescer, both dissolved in a liquid diluent, in proportions to produce chemiluminescence by said reaction.

9. A process for generating chemiluminescence comprising reacting a peroxide component with a composition defined by claim 5.

10. A process defined by claim 9, wherein the peroxide component is hydrogen peroxide.

* * * * *

Disclaimer 4,407,743.—*Shin-Shyong Tseng*, Bridgewater, N.J. NOVEL N,N'-BIS(TRIFLUOROMETHYLSULFONYL)OXAMIDES AND CHEMILUMINESCENT COMPOSITIONS CONTAINING THE SAME. Patent dated Oct. 4, 1983. Disclaimer filed Mar. 27, 1986, by the assignee, *American Cyanamid Co.*

The term of this patent subsequent to Oct. 7, 1997, has been disclaimed.
[*Official Gazette June 17, 1986.*]